US008623318B2

(12) United States Patent
Powell et al.

(10) Patent No.: US 8,623,318 B2
(45) Date of Patent: Jan. 7, 2014

(54) MANUFACTURE OF HIGH-STRENGTH, LOW-SALT AQUEOUS SODIUM HYPOCHLORITE BLEACH AND SUBSTANTIALLY DRY CRYSTALLINE SALT

(75) Inventors: Duane J Powell, Alma, MI (US);
Robert B. Bebow, Alma, MI (US);
Brent J. Hardman, St. Louis, MI (US)

(73) Assignee: Powell Technologies LLC, St. Louis, MI (US)

( * ) Notice: Subject to any disclaimer, the term of this patent is extended or adjusted under 35 U.S.C. 154(b) by 2051 days.

(21) Appl. No.: 11/652,890

(22) Filed: Jan. 12, 2007

(65) Prior Publication Data
US 2007/0114489 A1    May 24, 2007

Related U.S. Application Data

(63) Continuation-in-part of application No. 11/178,580, filed on Jul. 11, 2005, now Pat. No. 7,175,824.

(60) Provisional application No. 60/587,102, filed on Jul. 12, 2004.

(51) Int. Cl.
*C01B 11/06* (2006.01)

(52) U.S. Cl.
USPC .......................................... 423/473; 423/472

(58) Field of Classification Search
USPC .................................................. 423/472, 473
See application file for complete search history.

(56) References Cited

U.S. PATENT DOCUMENTS

| 3,287,233 | A | | 11/1966 | Aigueperse et al. |
| 3,656,931 | A | * | 4/1972 | Dancy ............................... 71/33 |
| 3,702,234 | A | | 11/1972 | Pavia |
| 4,043,861 | A | * | 8/1977 | Jacob et al. ................... 438/693 |
| 4,200,529 | A | * | 4/1980 | Fink et al. ...................... 210/784 |
| 4,330,521 | A | | 5/1982 | Glineur |
| 4,428,918 | A | | 1/1984 | Verlaeten et al. |
| 4,716,027 | A | * | 12/1987 | Morrison ....................... 423/225 |

(Continued)

FOREIGN PATENT DOCUMENTS

| JP | 72-16463 | 5/1972 |
| JP | 54118398 | 9/1979 |

(Continued)

*Primary Examiner* — Ngoc-Yen Nguyen
(74) *Attorney, Agent, or Firm* — George L. Boller

(57) ABSTRACT

A method for continuous manufacture of higher-strength, lower-salt, aqueous sodium hypochlorite bleach from lower-strength aqueous sodium hypochlorite bleach that has some sodium hydroxide and that is essentially free of sodium chloride (salt) crystals, aqueous sodium hydroxide solution having a concentration by weight within a range from about 45% to about 51%, chlorine in gas and/or liquid phase that may or may not include inerts, and a recycle solution. Slurry is withdrawn from the tank at a level below where the lower-strength bleach, the sodium hydroxide solution, the chlorine, and the recycle solution begin to mix with slurry already in the tank. A first portion of the slurry is withdrawn and used as the recycle solution. A second portion of the slurry is withdrawn and processed to separate substantially all salt crystals from residual liquid that is recovered as the higher-strength lower-salt, aqueous sodium hypochlorite bleach. The separation processes uses a pre-thickening tank, a hydrocyclone, and a two-stage centrifuge to recover substantially dry crystalline salt having at least 96% salt content.

13 Claims, 2 Drawing Sheets

(56) References Cited

U.S. PATENT DOCUMENTS

| | | |
|---|---|---|
| 4,780,303 A | 10/1988 | Dugua |
| 5,116,594 A | 5/1992 | Hilliard et al. |
| 5,180,569 A * | 1/1993 | Erickson et al. ............. 423/319 |
| 5,194,238 A | 3/1993 | Duncan et al. |
| 5,258,340 A * | 11/1993 | Augustine et al. ............. 502/60 |
| 5,961,879 A | 10/1999 | Trigiante |

FOREIGN PATENT DOCUMENTS

| | | |
|---|---|---|
| JP | 79118398 | 9/1979 |
| JP | 59008603 | 1/1984 |
| JP | 62270406 | 11/1987 |
| JP | 11021105 | 1/1999 |
| JP | 11060204 | 3/1999 |
| JP | 11255503 | 9/1999 |

* cited by examiner

MANUFACTURE OF HIGH-STRENGTH, LOW-SALT AQUEOUS SODIUM HYPOCHLORITE BLEACH AND SUBSTANTIALLY DRY CRYSTALLINE SALT

REFERENCE TO RELATED APPLICATIONS AND PRIORITY CLAIMS

This application is a continuation-in-part of and claims the priority of non-provisional application Ser. No. 11/178,580, filed 11 Jul. 2005, now U.S. Pat. No. 7,175,824, in the names of DUANE J POWELL et al., which claims priority of Provisional Application No. 60/587,102, filed on 12 Jul. 2004 in the name of DUANE POWELL et al., the content of both prior applications being incorporated herein by reference. This application also claims the priority of non-provisional application Ser. No. 11/648,411, filed 29 Dec. 2006, now U.S. Pat. No. 8,491,864, in the names of DUANE J POWELL et al., which is a continuation-in-part of non-provisional application Ser. No. 11/178,580, filed 11 Jul. 2005, now U.S. Pat. No. 7,175,824, in the names of DUANE J POWELL et al., which claims priority of Provisional Application No. 60/587, 102, filed 12 Jul. 2004 in the names of DUANE POWELL et al.

FIELD OF THE INVENTION

This invention relates to the manufacture of sodium hypochlorite bleach, in particular a process and apparatus for the concurrent manufacture of aqueous sodium hypochlorite bleach and crystalline salt.

BACKGROUND OF THE INVENTION

Bleach (sodium hypochlorite) is a commodity chemical that is used in numerous applications. The basic chemistry for manufacturing bleach is a matter of common knowledge in the fields of chemistry and chemical engineering. Chlorine in gas and/or liquid phase is allowed to react with a solution of sodium hydroxide (caustic) to yield aqueous sodium hypochlorite. While that basic chemistry may be considered rather elementary, and essentially common to all processes for the commercial manufacture of bleach, specific processes that have been described in patent literature differ in significant ways.

Each of the various known processes for the commercial manufacture of bleach may be characterized as either a batch (discontinuous) production process or a continuous production process. Each type of process may have its own particular advantages.

A continuous process that is properly controlled is more likely to be performed with higher production efficiency than a corresponding batch process, and hence is likely to be more economical than a batch process. However, the specific manner in which a continuous process is performed plays a significant role in the nature and quality of the resulting bleach product.

U.S. Pat. Nos. 4,428,918 and 4,780,303 each describes a respective continuous process for manufacture of concentrated (i.e. high-strength) sodium hypochlorite solutions. Sodium chloride (salt) is however also a product of the basic reaction, and its removal from the aqueous sodium hypochlorite product can improve both the continuous process and the resulting product. Neither of those processes removes all of the salt from the resulting product.

According to U.S. Pat. No. 4,428,918, a fraction of the suspension from a central reaction chamber overflows the top of an inner cylindrical wall surrounding the reaction chamber inside a tank to fall into an annular space between the inner wall and the sidewall of the tank. Near the top of the annular space some of that fraction is diverted from the tank to filtration apparatus while the balance passes downwardly through the annular space to the bottom of the tank where it is recycled into the reaction chamber. The patent further says that in the filtration apparatus, a filter cake is separated, containing, by weight, 80.1% of sodium chloride and 19.9% of sodium hypochlorite and 1775 kg per hour of an aqueous solution of sodium hypochlorite is recovered, containing, per kg, 257 g of sodium hypochlorite and 94 g of dissolved sodium chloride. The ultimate disposition of the salt cake is not discussed.

According to U.S. Pat. No. 4,780,303, sodium hypochlorite solution leaves the top of a crystallizer tank at the rate of about 14 kg/hr and contains about 25% NaOCl, 9.5% of sodium chloride, as well as a slight excess of sodium hydroxide. The reader is led to understand that it is that solution that the patent considers as the high strength bleach product. The patent further mentions that precipitated salt is removed, continuously or intermittently, from the crystallizer tank through conduit at the bottom of the tank. The mean crystal size of the sodium chloride removed is said to be in the neighborhood of 400 microns, a size that facilitates rapid filtration and reduces the retention of mother liquor in the salt so that there is very small sodium hypochlorite retention in the sodium chloride after subsequent filtration.

Both patents recognize that certain batch processes can produce aqueous high-strength bleach from which significant amounts of salt have been removed.

It is believed that a continuous process that is capable of consistently producing aqueous high-strength bleach with low concentrations of both sodium chloride and sodium chlorate with residual slight excess caustic would be beneficial to industry. A product that has even greater strength, and lower salt and chlorate concentrations, than those mentioned in U.S. Pat. Nos. 4,428,918 and 4,780,303 would be especially beneficial. The benefits reside both in the utility of the product and relevant economic factors.

The processes that are described in the inventors' priority provisional and non-provisional patent applications employ a crystallizer stage in which the reactants create a salt slurry in a bottom zone of a crystallizer tank. As fresh solutions of lower-strength bleach and caustic continuously enter into solution in the tank, the salt slurry at the bottom is being continuously pumped out.

A first portion of the withdrawn slurry forms a recycle solution that is cooled during passage through a heat exchanger before being fed back into the crystallizer tank. The fresh caustic is entrained with the recycle solution ahead of the heat exchanger. Fresh lower-strength bleach is entrained with the entrained caustic and recycle solution after the heat exchanger.

The crystallizer stage tank shown in the two earliest priority patent applications comprises a skirt baffle that is inside the cylindrical sidewall of the tank and forms a cylindrical wall to create an annular calming zone between the skirt baffle and the tank sidewall. The annular calming zone is essentially free of turbulence, especially toward the top where an upper zone of essentially crystal-free mother liquor is created. The skirt baffle surrounds a central inner zone into which the fresh bleach and caustic and the recycle solution are introduced. The annular calming zone and the central inner zone are both above and open to the bottom zone.

Continually overflowing mother liquor at an appropriate rate from the top of the calming zone supersaturates the solution resulting in salt continuously precipitating out of solution with the salt crystals continuously replenishing the slurry in the bottom zone.

The third priority patent application Ser. No. 11/648,411 relates to a simplification of the equipment that eliminates the skirt baffle inside the crystallizer stage tank. The continuous process is conducted in a crystallizer tank without continuously drawing off mother liquor at the top of a calming zone. That allows the tank to not have a skirt baffle that otherwise would divide the portion of the tank above the bottom zone into a central inner zone surrounded by an outer calming zone.

The higher-strength, lower-salt bleach products that can be manufactured are those which comprise an aqueous solution of greater than 25% by weight sodium hypochlorite and a ratio, on a % weight basis, of NaCl (salt) to NaOCl (sodium hypochlorite), less than substantially 0.38, with a slight excess of sodium hydroxide (caustic). After removal of solids, a bleach having approximately 30% to approximately 35% by weight sodium hypochlorite and a NaCl/NaOCl ratio of about 0.21 to about 0.25 at 30% strength and about 0.10 to about 0.15% at 35% strength, with slight excess caustic, is one example of such a higher-strength, lower-salt bleach product.

A solution of the fresh caustic, the fresh lower-strength bleach that is essentially free of salt crystals, and salt slurry withdrawn from the bottom zone of the tank to form the recycle solution are continuously introduced into the crystallizer tank. The solution in the tank is chlorinated by introducing chlorine in liquid and/or gas phase, wet or dry, with or without inerts. The percentage of excess caustic in solution is controlled in any suitable manner using an appropriate measurement, such as oxidation-reduction potential measurement, by commercially available equipment.

A heat exchanger associated with the crystallizer tank removes heats of solution and reaction from slurry that is withdrawn from the tank to form the recycle solution. By using a high recycle rate through the heat exchanger, the temperature drop between the recycle outlet from the tank and the recycle return to the tank can be kept small, a benefit that aids crystal formation while avoiding fouling of the heat exchanger. A temperature drop within a range from about 1° F. to about 4° F. would be typical, with a range from about 1° F. to about 2° F. being most preferable.

In order to control the temperature drop to within such a range, the heat exchanger is one that has sufficient heat transfer surface area in relation to the flow rates of the respective liquids passing through it and that presents low restriction to the flows. By suitable control of chemical processes in the crystallizer stage, the temperature of those processes can be kept within a range that allows sometimes allows cooling tower water to be used as the cooling liquid in certain types of heat exchangers, avoiding the need to use more expensive refrigerated water in those instances.

The temperature difference between the recycle solution and the cooling liquid passing through the heat exchanger is also controlled. A target range of temperature differences that avoid fouling of the heat exchanger depends on the design of the particular heat exchanger. For a plate and frame type heat exchanger, the temperature difference may have a range of from about 2° F. to about 3° F. The temperature difference may have a larger range, 5° F.-15° F. for example, for other heat exchangers, such as a shell and tube type.

The fresh caustic is preferably added to the recycle solution ahead of the heat exchanger. The caustic is itself preferably cooled by passage through its own heat exchanger before being added to the recycle solution. The fresh lower-strength bleach is added to entrain with the entrained caustic and recycle solution after the latter have been cooled.

With the process continuously running, the continuous introduction of chlorine and the mixture of recycle solution, caustic, and lower-strength bleach sustains a continuous reaction in the tank to produce higher-strength bleach. The mixture of recycle solution, fresh caustic, and fresh lower-strength bleach, is introduced into solution already in the tank at a level above a bottom zone from which the recycle solution is being withdrawn. The chlorine is also introduced above the bottom zone, and above the level at which the liquid mixture is being introduced.

The level to which solution fills in the tank is controlled, or regulated, in any suitable manner, by process control apparatus. No solution overflows the tank or is withdrawn from the tank at a level above the bottom zone. Solution that is withdrawn from the bottom zone as a slurry becomes either recycle solution returned to the tank or is subsequently processed to yield the final higher-strength, lower-salt bleach product. In the absence of a distinct calming zone in the crystallizer tank as described in the priority patent applications, the solution in the tank is generally homogeneous, especially in the bottom zone.

Process control conditions can create sufficiently large crystal sizes for effective removal of crystals by mechanical processes with the resulting distribution of salt crystal sizes in the slurry rendering them well-suited for ultimate recovery as essentially dry solids.

SUMMARY OF THE INVENTION

The present invention, in one respect, relates to an improvement in the apparatus and method for processing of a salt slurry from a crystallizer stage tank to recover the aqueous high-strength, low-salt bleach product from the slurry while separating out salt crystals. The salt separation can be performed in different ways. One way yields a substantially dry cake comprising at a minimum about 96% salt, with the remainder being liquid and minor amounts of trace chemicals that include bleach. That salt cake can be further dried by an additional drying process. Salt separation can also include a treatment that neutralizes residual bleach, with or without subsequent drying.

The higher-strength, lower-salt bleach produced by the inventive process and apparatus has strength that, when diluted to a lower strength comparable with typical domestic commercial bleaches, has improved stability, and hence extended half-life when compared to such bleaches.

The withdrawn slurry contains a suspension of salt crystals in the higher-strength aqueous bleach product. The disclosed embodiment of the improved apparatus and method for processing the withdrawn slurry separates out salt crystals by first continually introducing the withdrawn slurry into a pre-thickening tank where the slurry is mechanically agitated, either by a mixer and/or by air under pressure blowing through it (air sparging) prior to subsequent thickening processing At the same time, slurry is being continually pumped from the pre-thickening tank to a device such as a hydrocyclone that separates out a substantial amount of liquid, or filtrate as the higher-strength lower-salt bleach product. The removed product is pumped into a product tank leaving the remainder as thickened wet salt that is suitable for centrifuging.

Although the use of a hydrocyclone, or an equivalent machine, can render the thickened wet salt suitable for subsequent centrifuging, the thickened wet salt still contains some bleach content. However, the bleach content in the final crystalline product can be significantly reduced by using a two-stage centrifuge to process the thickened wet salt from the hydrocyclone. Processing by a two-stage centrifuge allows the salt being recovered to be water-washed between centrifuging stages, yielding a final product in the form of a substantially dry cake that at a minimum comprises about 96% salt, with the remainder being liquid and minor amounts of trace chemicals that include a small amount of residual bleach. Filtrate from the first stage of the centrifuge is returned to the crystallizer tank. When the water-wash includes a bleach neutralizing chemical or chemicals, the final salt product can be rendered bleach-free. After the second centrifuging, the salt can in either case be optionally dried.

While the product tank serves as a holding tank from which the higher-strength, lower-salt bleach can be withdrawn for packaging and/or shipment in bulk, that may or may not include dilution before being packed and/or loaded into a bulk shipment tank, the product tank is also piped to the pre-thickening tank to provide for overflow of filtrate from the product tank to be returned to the pre-thickening tank, as will be more fully explained in later description.

The higher-strength, lower-salt bleach product produced by the inventive process has a bleach strength greater than 25% by weight. The specific strength of a particular bleach product may be limited by decomposition issues during the production process and size of salt crystals precipitated, especially as bleach strength nears its upper limit, which as a practical matter is about 35%. The crystalline salt product concurrently created is suitable for re-sale as a commodity, and with its degree of purity and distribution of crystal sizes may even command a premium price on the open market.

A generic aspect of the invention relates to a method for the continuous simultaneous manufacture of higher-strength, lower-salt, aqueous sodium hypochlorite bleach and of substantially dry crystalline salt from slurry that is being continuously withdrawn from a first tank in which a continuous reaction is producing the slurry as a suspension of salt crystals in higher-strength aqueous sodium hypochlorite bleach resulting from the continuous introduction into the tank of 1) a lower-strength aqueous sodium hypochlorite bleach that has some sodium hydroxide and is essentially free of salt crystals, 2) aqueous sodium hydroxide solution having a concentration by weight within a range from about 45% to about 51%, 3) chlorine in gas and/or liquid phase that may or may not include inerts, and 4) a recycle solution comprising slurry continuously withdrawn from the tank at a level below where the lower-strength bleach, the sodium hydroxide solution, the chlorine, and the recycle solution begin to mix with slurry already in the tank.

The method comprises: continuously withdrawing from the tank, at a level below where the lower-strength bleach, the sodium hydroxide solution, the chlorine, and the recycle solution begin to mix with slurry already in the tank, slurry that is to be further processed to yield the higher-strength, lower-salt, aqueous sodium hypochlorite bleach and the substantially dry crystalline salt.

The further processing comprises: continuously introducing the slurry that is to be further processed into a second tank; agitating the slurry in the second tank; continuously withdrawing slurry from the second tank and introducing it into a thickening device; in the thickening device, extracting a substantial portion of liquid from the slurry as the higher-strength, lower-salt, aqueous sodium hypochlorite bleach thereby creating thickened wet salt; continuously withdrawing the thickened wet salt from the thickening device and introducing it into a two-stage centrifuge; in the two-stage centrifuge, continuously centrifuging the thickened wet salt in a first stage to remove more liquid, then washing the salt from the first stage of the centrifuge, and then centrifuging the washed salt in a second stage to remove liquid and yield the substantially dry crystalline salt.

BRIEF DESCRIPTION OF THE DRAWINGS ILLUSTRATING PRACTICE OF THE INVENTIVE PROCESS

DESCRIPTION OF THE INVENTIVE APPARATUS AND METHOD

Figure 1:
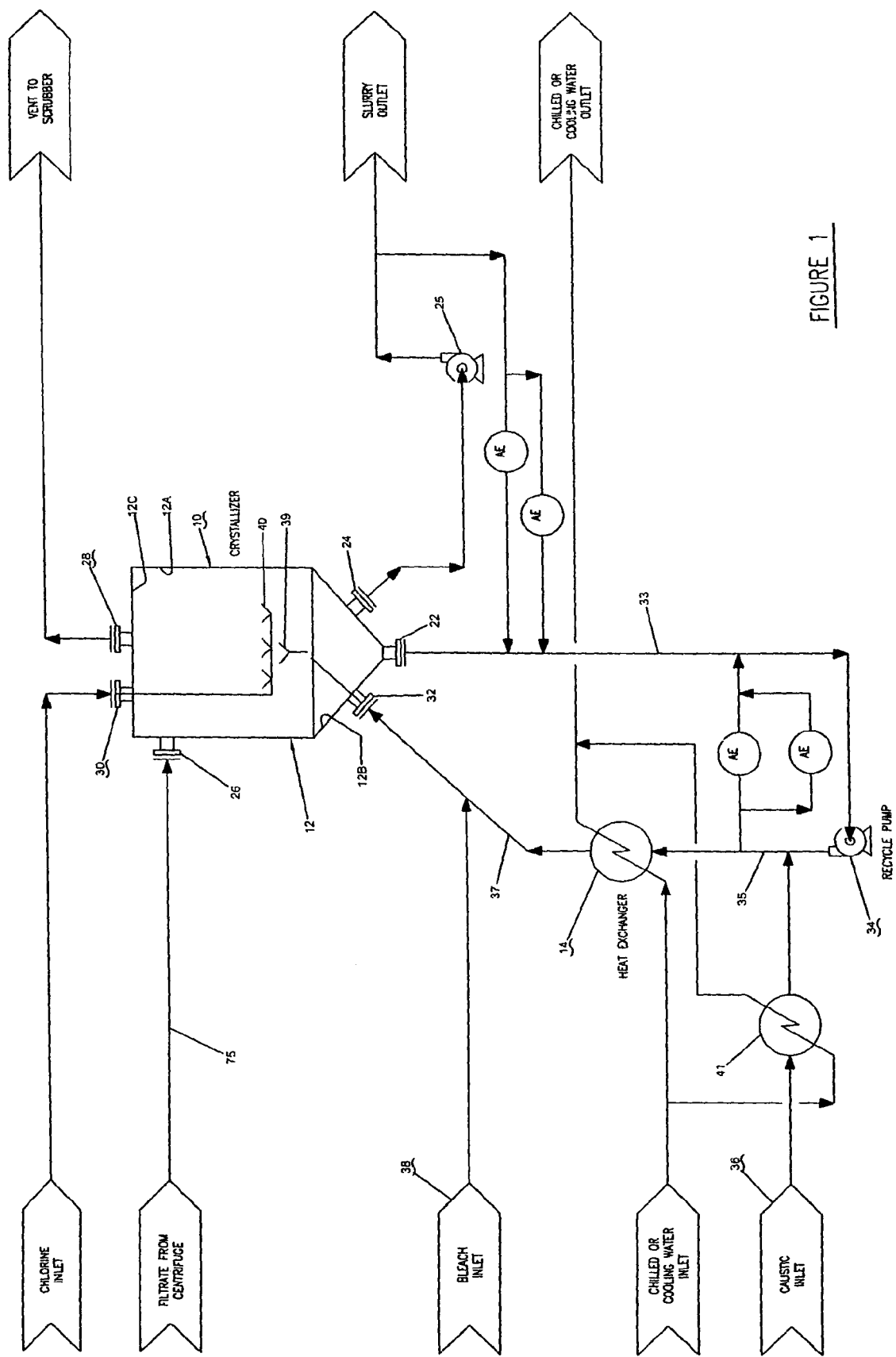
FIG. 1 illustrates schematically an example of a crystallizer stage for producing a salt slurry that is subsequently processed in accordance with principles of the invention.

The stage shown in FIG. 1 comprises a crystallizer 10 that comprises a tank 12 with which a heat exchanger 14 is associated, as described above. The drawing does not show a first stage like the one described in the two earliest priority applications for making the lower-strength bleach. It is to be appreciated that the lower-strength bleach that is introduced into tank 12 could have been manufactured elsewhere by any suitable process. Tank 12 comprises a cylindrical sidewall 12A, a conical bottom wall 12B, and a top wall 12C.

This crystallizer stage has various inlets to and outlets from tank 12. A recycle outlet 22 is at or near the center low point of conical bottom wall 12B. A slurry outlet 24 is in the conical bottom wall 12B at a level above that of outlet 22. Precise locations for the two outlets 22, 24 are generally not critical provided that they are open to a bottom zone of the solution in tank 12 where slurry collects. An outlet may even be at an end of a pipe that penetrates and extends into the interior of the tank beyond the tank wall. The outlets may have a common opening to the slurry, for example the outlet 24 teeing into a conduit 33 extending from outlet 22 instead of being at wall 12B.

The tank has a filtrate inlet 26 that allows filtrate delivered through a conduit 75 from a centrifuge that will be described later with reference to FIG. 2 to be introduced into tank 12. A vent outlet 28 provides an escape for any residual chlorine gases and inert gases to a standard commercial chlorine scrubber (not specifically shown).

Two other inlets to tank 12 are a chlorine inlet 30 and a recycle inlet 32. A recycle pump 34 draws slurry from the bottom of the tank through outlet 22 and a conduit 33 that leads to the suction side of the pump. The pump pumps the liquid through a conduit 35 leading from the pump outlet to heat exchanger 14. Fresh caustic introduced through a caustic inlet 36, and preferably cooled by first passing through a heat exchanger 41 after entering the caustic inlet, is added to the recycle solution being pumped through conduit 35 at a location between pump 34 and heat exchanger 14. Lower-strength bleach is added through a bleach inlet 38 to a conduit 37 that extends from heat exchanger 14 to recycle inlet 32. Although the illustrated apparatus shows the tank having a single inlet through which a mixture of bleach, fresh caustic and recycle solution are introduced, other plumbing arrangements may be used for introducing the various solutions into tank 12.

The entrained solutions of fresh caustic, fresh lower-strength bleach and recycle slurry, are introduced into tank 12 through recycle inlet 32. The actual location at which the entrained solutions enter into solution already in the tank is at any suitable location that does not significantly disrupt the accumulation of slurry at the bottom of tank 12 and withdrawal of accumulated, substantially homogeneous slurry from the bottom zone of the tank. The drawing shows a preferred central location above the bottom zone, where the entrained solutions entering through inlet 32 are conveyed through a conduit leading to an upright funnel 39 that has an increasing diameter for promoting good distribution of the entrained solutions as they begin to mix with solution already in the tank.

Chlorine passing into tank 12 through inlet 30 is conveyed through a conduit to a distribution system 40 arranged to direct chlorine into the solution in the tank to chlorinate the caustic. Outlet openings in distribution system 40 are directed downward to avoid potential clogging. They are disposed at a level that allows the gas or liquid pressure of the chlorine, depending on the state in which the chlorine is introduced, to be the force that moves the chlorine through the outlet openings in distribution system 40.

Without the baffle skirt that is present in the crystallizer tank shown in the two earliest priority patent applications, no calming zone is created, and consequently neither is any mother liquor zone created in the solution in tank 12 behind the baffle skirt. The locations at which the reactants begin to mix with slurry already in the tank is at a central location that is not obstructed from the sidewall of the tank, unlike in the priority patent applications where the baffle skirt presents an intentional obstruction to the sidewall for creating the calming zone.

As will be further explained in more detail later, the high-strength, lower-salt bleach product resulting from the continuous process of the present invention is obtained by drawing slurry from tank 12 through outlet 24 by pumping it out via a pump 25 for subsequent processing in accordance with FIG. 2.

The rate of heat is liberated by chemical processes occurring in crystallizer 10 is a function of the throughput through the crystallizer. Consequently, the recycle rate and the cooling liquid rate through the heat exchanger are controlled in relation to the crystallizer throughput so as to maintain both the small temperature drop in the recycle solution as it passes through the heat exchanger and a temperature difference between the recycle solution and the cooling liquid appropriate for the particular type of heat exchanger used, as mentioned above. It is in that context that the process is said to have a high recycle rate. FIG. 1 also shows some process control equipment in the form of redundant sensor pairs AE disposed in respective flow loops from the outlets of pumps 25 and 34 to the suction side of pump 34. The sensors monitor chlorination to assure compliance with control limits. Service valves (not shown) can shut off flow through either sensor of a pair to allow its replacement without shutting down the process.

Figure 2:
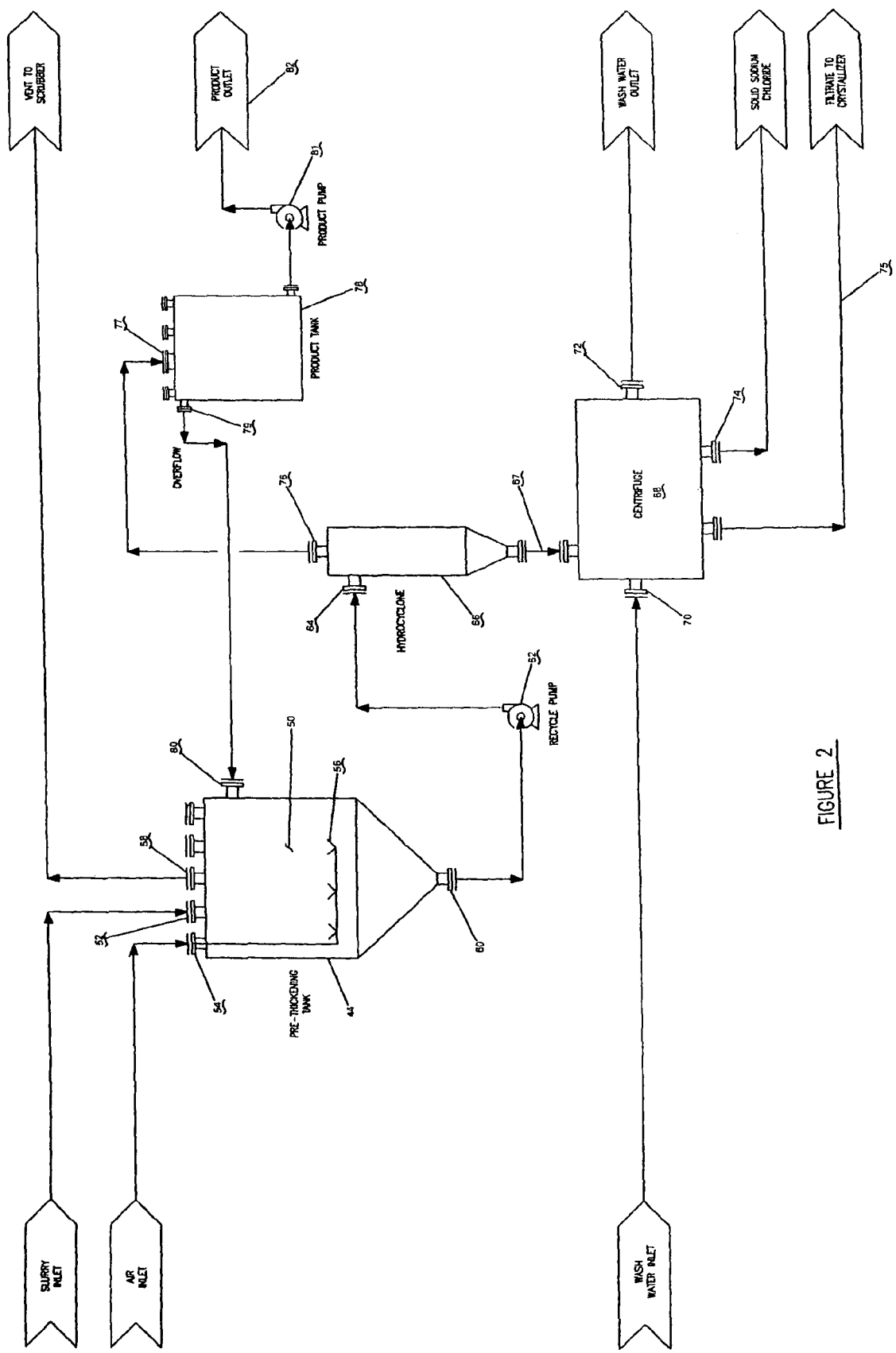
FIG. 2 illustrates schematically a presently preferred embodiment of the inventive apparatus and method for processing the salt slurry from the crystallizer stage.

FIG. 2 shows the apparatus and method for processing the slurry from pump 25 to separate salt crystals from the higher-strength aqueous bleach. The slurry is introduced into a pre-thickening tank 44 that is similar to tank 12 in that it has a sidewall, a conical bottom wall, and a top wall. Slurry is pumped into tank 44 through a slurry inlet 52 where it falls downward toward a zone 50 of slurry already in the tank. The slurry within zone 50 is agitated in any suitable way, for example, by the use of air sparging as illustrated. Air under pressure is supplied through an air inlet 54 to a distribution system 56 that is arranged to direct the air upward through slurry in zone 50. The air and any entrained gases leaving the slurry are vented through a vent outlet 58 in the top wall leading to a scrubber (not specifically shown). A mechanical agitator (not specifically shown in the Figure) may be used in lieu of, or in conjunction with, the air sparging.

A recycle pump 62 pumps slurry from a location at or near the bottom of zone 50 out of tank 44 through a slurry outlet 60. The particular outlet shown is at the low point of the conical bottom tank wall. The pumped slurry is conveyed to an inlet 64 of a hydrocyclone 66 that operates to separate a substantial amount of liquid from the slurry, significantly leaving the remainder that is discharged from hydrocyclone 66 through a conduit 67 suitable for processing by a centrifuge 68 that is used to complete the recovery of crystallized salt.

A preferred centrifuge is a two-stage centrifuge that allows the salt to be washed between centrifuging stages during the recovery process. The thick wet salt from hydrocyclone 66 is first centrifuged in a first stage of centrifuge 68 to remove a large percentage of liquid and leave solids having small liquid content. The solids are then washed and subsequently centrifuged in a second stage of the centrifuge. Water is an example of one fluid that may be used for washing. Hence FIG. 2 shows a wash water inlet 70 and a wash water outlet 72. Washing the solids removes significant amounts of residual chemicals, such as hypochlorite, from the wet salt that is delivered to the centrifuge through conduit 67. The second stage of centrifuging removes liquid, largely wash water from the salt leaving a final crystalline salt product that leaves through a solids outlet 74. Typical amounts of bleach in the final salt product are in the range of about 0.2% to about 0.3% by weight.

The wash water is typically some form of treated water, such as de-ionized water or softened water, depending on how the final salt product from the centrifuge will be used. Where the salt is re-cycled to make brine that is processed by a chlor-alkali plant to make chlorine and caustic used in the inventive process, de-ionized water should be used. Any residual bleach also needs to be neutralized. Otherwise soft water can be used, with the spent wash water being used in a dilution system for diluting the higher-strength, lower-salt bleach before packaging and/or shipment. If the spent wash water is not used on-site, proper disposal is needed. Salt that is to be sold can be fully dried by drying equipment, not specifically shown in the drawing. Although the final salt product is substantially pure, it will have some trace elements, with bleach content being about 0.2% to about 0.3%, unless the bleach is neutralized in some way. One way to neutralize the bleach is to include a neutralizing chemical or chemicals in the wash water.

Filtrate from the first stage of centrifuge 68 is returned through conduit 75 to crystallizer tank 12 (see FIG. 1 again), and the liquid that is separated from the slurry by hydrocyclone 66 becomes filtrate that is delivered through an outlet 76 from the hydrocyclone to an inlet 77 of a product tank 78 where the filtrate is collected as the higher-strength, lower-salt bleach product of the process.

The aqueous bleach product is pumped out of tank 78 by a pump 81 and delivered through a product outlet 82 for further use on-site in other processes and/or transport to an on-site or off-site location for bulk shipment and/or packaging preparatory to shipment. As mentioned before, the bleach from tank 78 can be diluted by on-site dilution equipment not specifically shown in the drawing.

Any product overflow from tank 78 is returned to an inlet 80 of tank 44 through an outlet 79 of tank 78. By locating outlet 79 at a suitably higher elevation that that of inlet 80, gravity can be used to advantage to return the overflow to tank 44. Alternately, a pump, such as product pump 81 could be used, in conjunction with suitable plumbing and controls, to return product from tank 78 to tank 44 when needed. The need for recycling some of the finished product back to tank 44 arises because the process rate is not as great as the rate that the hydrocyclone requires in order to be effective.

The bleach product in tank 78 will contain some amount of sodium chlorate. That amount is to some extent a function of the reaction temperature. In general a lower reaction temperature will result in lower chlorate concentration. Consequently, certain principles of the inventive process apply to plants that use refrigerated water, as opposed to cooling tower water, in order to enable the reaction temperature to be lower. On the other hand, the high-strength of the bleach product produced by the process allows for its dilution by the addition of water, and while that will necessarily reduce bleach strength, it will be also effective in reducing chlorate concentration.

Potassium hydroxide can be substituted for sodium hydroxide to produce potassium hypochlorite in a similar manner.

While a presently preferred embodiment of the invention has been illustrated and described, it should be appreciated that principles of the invention are applicable to all embodiments that fall within the scope of the claims that follow hereinafter.

What is claimed is:

1. A method comprising:
   continuously simultaneously manufacturing both a higher-strength, lower-salt, aqueous sodium hypochlorite bleach product and a substantially dry crystalline salt product by continuously withdrawing a slurry from a first tank in which a continuous reaction is producing the slurry as a suspension of salt crystals in higher-strength aqueous sodium hypochlorite bleach by continuously introducing into the first tank 1) a lower-strength aqueous sodium hypochlorite bleach that has some sodium hydroxide and is essentially free of salt crystals, 2) an aqueous sodium hydroxide solution having a concentration by weight within a range from about 45% to about 51%, 3) chlorine in gas and/or liquid phase that may or may not include inerts, and 4) a recycle solution comprising slurry continuously withdrawn from the tank at a level below where the lower-strength bleach, the sodium hydroxide solution, the chlorine, and the recycle solution begin to mix with slurry already in the tank;
   continuously withdrawing from the first tank, at a level below where the lower-strength aqueous sodium hypochlorite bleach, the aqueous sodium hydroxide solution, the chlorine, and the recycle solution begin to mix with slurry already in the tank, slurry that is to be further processed to yield the higher-strength, lower-salt, aqueous sodium hypochlorite bleach product and the substantially dry crystalline salt product;
   wherein the further processing comprises,
   continuously introducing the slurry withdrawn from the first tank into a second tank,
   agitating the slurry in the second tank,
   continuously withdrawing slurry from the second tank,
   continuously introducing the slurry withdrawn from the second tank into a thickening device,
   in the thickening device, extracting a substantial portion of liquid from the slurry as the higher-strength, lower-salt, aqueous sodium hypochlorite bleach product thereby leaving thickened wet salt,
   continuously withdrawing the thickened wet salt from the thickening device and,
   continuously introducing the thickened wet salt from the thickening device into a two-stage centrifuge, and
   in the two-stage centrifuge, continuously centrifuging the thickened wet salt in a first stage of centrifuging to remove more liquid, then washing the salt from the first stage of centrifuging, and then centrifuging the washed salt from the first stage of centrifuging in a second stage of centrifuging to remove liquid and yield the substantially dry crystalline salt product.

2. A method as set forth in claim 1 wherein step of agitating the slurry in the second tank comprises,
   subjecting the slurry in the second tank to air sparging.

3. A method as set forth in claim 1 wherein the steps of continuously withdrawing slurry from the second tank, of continuously introducing the slurry withdrawn from the second tank into a thickening device, and of extracting a substantial portion of liquid from the slurry in the thickening device as the higher-strength, lower-salt, aqueous sodium hypochlorite bleach product thereby leaving thickened wet salt comprise,
   introducing the slurry withdrawn from the second tank into a hydrocyclone, and operating the hydrocyclone to extract a substantial portion of liquid from the slurry as the higher-strength, lower-salt, aqueous sodium hypochlorite bleach product.

4. A method as set forth in claim 3 further including the step of introducing the extracted liquid from the hydrocyclone into a third tank at a level above that of previously extracted liquid already in the third tank, and when extracted liquid being introduced into the third tank causes the liquid level in the third tank to rise to an upper limit, preventing the liquid level from rising further by causing extracted liquid to flow into the second tank.

5. A method as set forth in claim 4 wherein the upper limit is defined by an overflow outlet from the third tank and the step of preventing the liquid level from rising further by causing extracted liquid to flow into the second tank comprises causing the extracted liquid to flow by gravity into the second tank.

6. A method as set forth in claim 4 wherein the step of causing extracted liquid to flow into the second tank comprises pumping the extracted liquid from an outlet of the third tank into the second tank.

7. A method as set forth in claim 4 further including withdrawing liquid from the third tank from a bottom zone of liquid in the third tank, and processing the liquid withdrawn from the bottom zone of liquid for bulk or packaged shipment.

8. A method as set forth in claim 1 further comprising causing the liquid removed from the first stage of centrifuging to be returned to the first tank.

9. A method as set forth in claim 1 wherein the step of washing the salt from the first stage of centrifuging comprises washing the salt with water that includes one or more bleach neutralizing chemicals so that the substantially dry crystalline salt product resulting from the second stage of centrifuging is essentially bleach-free.

10. A method as set forth in claim 9 further comprising further drying the substantially dry crystalline salt product resulting from second stage of centrifuging after leaving the second stage of centrifuging.

11. A method as set forth in claim 1 wherein the step of washing the salt from the first stage of centrifuging comprises washing that salt with water that does not neutralize residual bleach so that the substantially dry crystalline salt product resulting from the second stage of centrifuging has about 0.2% to about 0.3% bleach content.

12. A method as set forth in claim 11 further comprising further drying the substantially dry crystalline salt resulting from the second stage of centrifuging after leaving the second stage of centrifuging.

13. A method comprising:
continuously simultaneously manufacturing both a higher-strength, lower-salt, aqueous sodium hypochlorite bleach product and a substantially dry crystalline salt product by continuously withdrawing a slurry from a first tank in which a continuous reaction is producing the slurry as a suspension of salt crystals in higher-strength aqueous sodium hypochlorite bleach by continuously introducing into the first tank 1) a lower-strength aqueous sodium hypochlorite bleach that has some sodium hydroxide and is essentially free of salt crystals, 2) an aqueous sodium hydroxide solution having a concentration by weight within a range from about 45% to about 51%, 3) chlorine in gas and/or liquid phase that may or may not include inerts, and 4) a recycle solution comprising slurry continuously withdrawn from the tank at a level below where the lower-strength bleach, the sodium hydroxide solution, the chlorine, and the recycle solution begin to mix with slurry already in the tank;

continuously feeding slurry from the first tank into a second tank;

continuously feeding slurry from the second tank to mechanical processing equipment; and operating the mechanical processing equipment to continuously create both the higher-strength, lower-salt, aqueous sodium hypochlorite bleach product and the substantially dry crystalline salt product from the slurry by mechanically removing substantially all liquid from the slurry as the higher-strength, lower-salt, aqueous sodium hypochlorite bleach product and leaving the substantially dry crystalline salt product, while causing some of the liquid removed from the slurry to be returned to the second tank.

* * * * *